(12) United States Patent
Su et al.

(10) Patent No.: US 11,076,325 B2
(45) Date of Patent: Jul. 27, 2021

(54) SELECTIVE MEASUREMENT OF NEIGHBOR BASE STATIONS

(71) Applicant: Apple Inc., Cupertino, CA (US)

(72) Inventors: Li Su, San Jose, CA (US); Vijay Venkataraman, Sunnyvale, CA (US); Muthukumaran Dhanapal, Dublin, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/822,071

(22) Filed: Mar. 18, 2020

(65) Prior Publication Data

US 2020/0329407 A1    Oct. 15, 2020

Related U.S. Application Data

(60) Provisional application No. 62/832,026, filed on Apr. 10, 2019.

(51) Int. Cl.
| | |
|---|---|
| *H04W 4/00* | (2018.01) |
| *H04W 36/00* | (2009.01) |
| *H04W 24/10* | (2009.01) |
| *H04W 84/04* | (2009.01) |

(52) U.S. Cl.
CPC ....... *H04W 36/0061* (2013.01); *H04W 24/10* (2013.01); *H04W 36/0058* (2018.08); *H04W 36/00835* (2018.08); *H04W 84/042* (2013.01)

(58) Field of Classification Search
CPC . H04W 24/00; H04W 24/10; H04W 36/0058; H04W 36/0061; H04W 36/00835; H04W 36/0085; H04W 36/0088; H04W 36/0094; H04W 36/30
See application file for complete search history.

(56) References Cited

U.S. PATENT DOCUMENTS

| | | |
|---|---|---|
| 7,162,247 B2 | 1/2007 | Baba et al. |
| 8,588,139 B2 | 11/2013 | Etemad |
| 8,717,964 B2 | 5/2014 | Chen et al. |
| 9,277,470 B2 | 3/2016 | Laroia et al. |
| 9,749,994 B2 | 8/2017 | Fong et al. |
| 9,854,483 B2 | 12/2017 | Chaudhuri et al. |
| 10,159,024 B2 | 12/2018 | Hahn et al. |
| 10,271,248 B2 | 4/2019 | Kim et al. |
| 10,389,432 B2 | 8/2019 | De Rosa et al. |
| 10,517,084 B2 | 12/2019 | Dinan |
| 10,560,955 B2 | 2/2020 | Shoshan et al. |
| 2012/0276945 A1 | 11/2012 | Chindapol et al. |
| 2015/0245402 A1* | 8/2015 | Mochizuki ............ H04W 36/22 370/331 |
| 2015/0249945 A1* | 9/2015 | Katamreddy ..... H04W 52/0216 455/436 |

(Continued)

*Primary Examiner* — Matthew W Genack
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) to selectively perform neighbor base station measurement. The UE may receive a neighbor base station list from the serving base station. The UE may categorize the neighbor base stations of the neighbor base station list into one of a plurality of measurement categories. The UE may be configured to perform measurements of neighbor base stations in respective categories at different rates.

20 Claims, 7 Drawing Sheets

(56) References Cited

U.S. PATENT DOCUMENTS

| | | | |
|---|---|---|---|
| 2016/0044552 A1* | 2/2016 | Heo | H04W 8/005 |
| | | | 370/331 |
| 2016/0150450 A1* | 5/2016 | Balasubramanian ... | G01S 19/01 |
| | | | 370/331 |
| 2019/0110205 A1* | 4/2019 | Shaik | H04W 48/16 |
| 2019/0174341 A1* | 6/2019 | Chincholi | H04W 24/10 |
| 2019/0223091 A1* | 7/2019 | Huang-Fu | H04L 27/2666 |
| 2019/0246329 A1 | 8/2019 | Abouelmaati et al. | |
| 2019/0349824 A1* | 11/2019 | Tsuda | H04W 36/0027 |
| 2021/0014751 A1* | 1/2021 | Callender | H04W 72/0446 |

\* cited by examiner

SELECTIVE MEASUREMENT OF NEIGHBOR BASE STATIONS

PRIORITY INFORMATION

This application claims benefit of priority of U.S. provisional application Ser. No. 62/832,026 titled "Selective Measurement of Neighbor Base Stations" filed Apr. 10, 2019, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to apparatuses, systems, and methods for acquiring on demand system information.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, for example in 5G new radio (NR), some system information is periodically broadcast by a cellular network while other system information is available on request. However, it may be up to an individual UE to determine when to request the on-demand system information. Further, communication failures (e.g., of a random access channel) may interfere with such a request for on-demand system information and it may be up to an individual UE to determine how to overcome such a problem. Thus, improvements in the field are desirable.

SUMMARY

Techniques are disclosed for a user equipment (UE) device to perform selective measurement of neighbor base stations. The UE may comprise at least one antenna for performing wireless communications, a radio coupled to the at least one antenna, and a processing element coupled to the radio, and may be configured to communicate in a wireless fashion with a wireless (e.g., cellular) network via at least one type of radio access technology (RAT).

In some embodiments, the UE may receive a neighbor base station list from the serving base station. The UE may categorize the neighbor base stations of the neighbor base station list into one of a plurality of measurement categories. The UE may be configured to perform measurements of neighbor base stations in respective categories at different rates.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
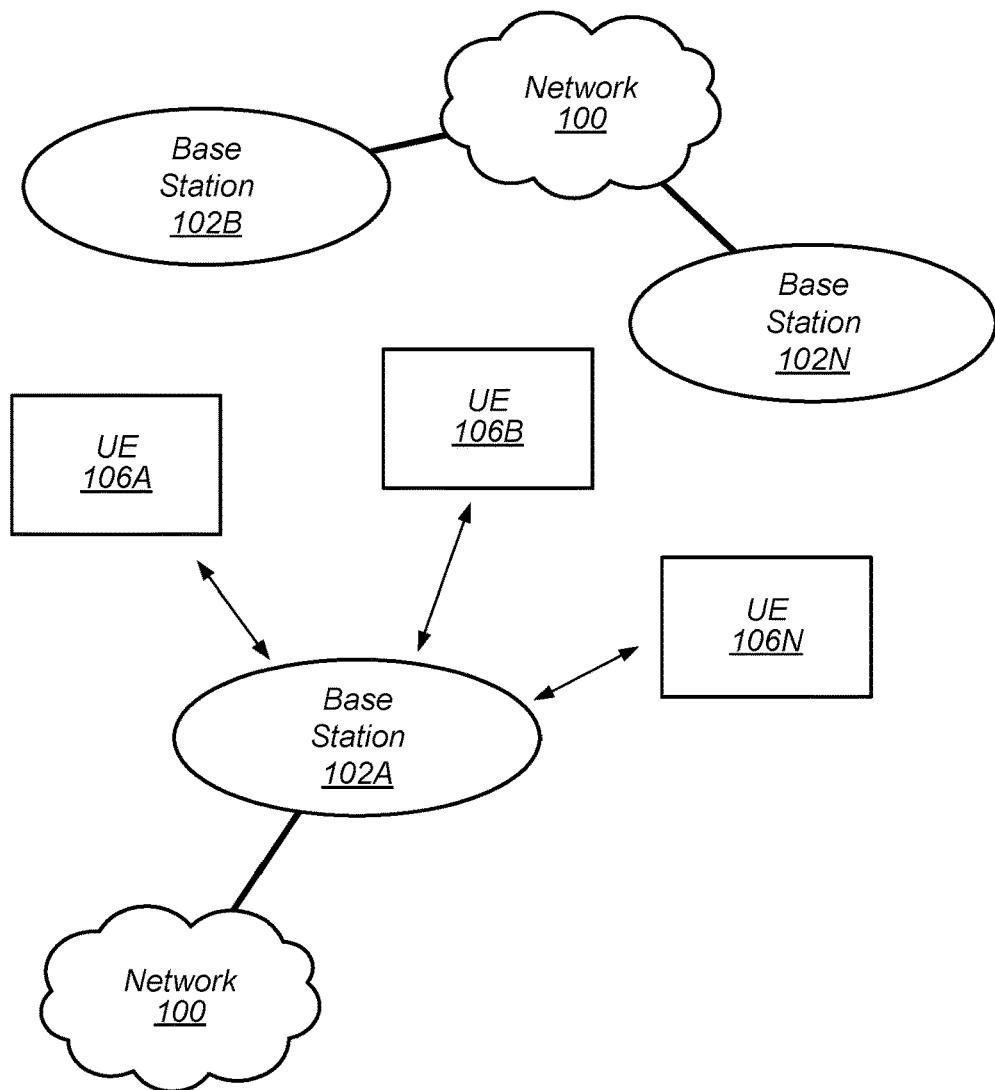
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:

UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface
Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as a smart watch), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
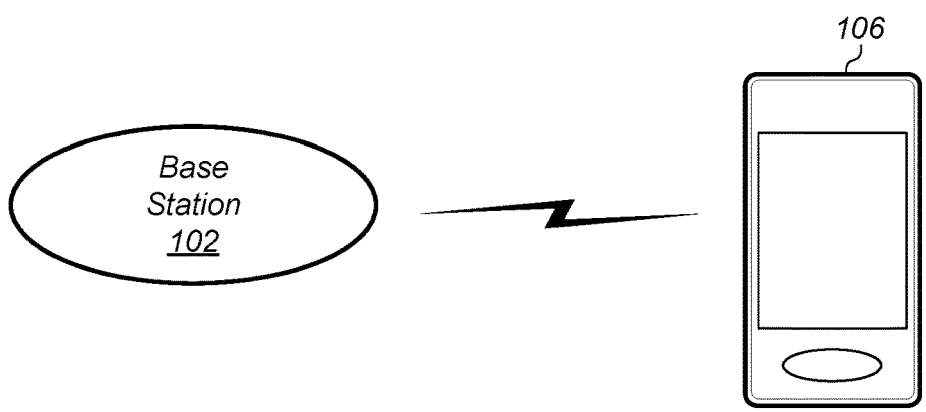
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
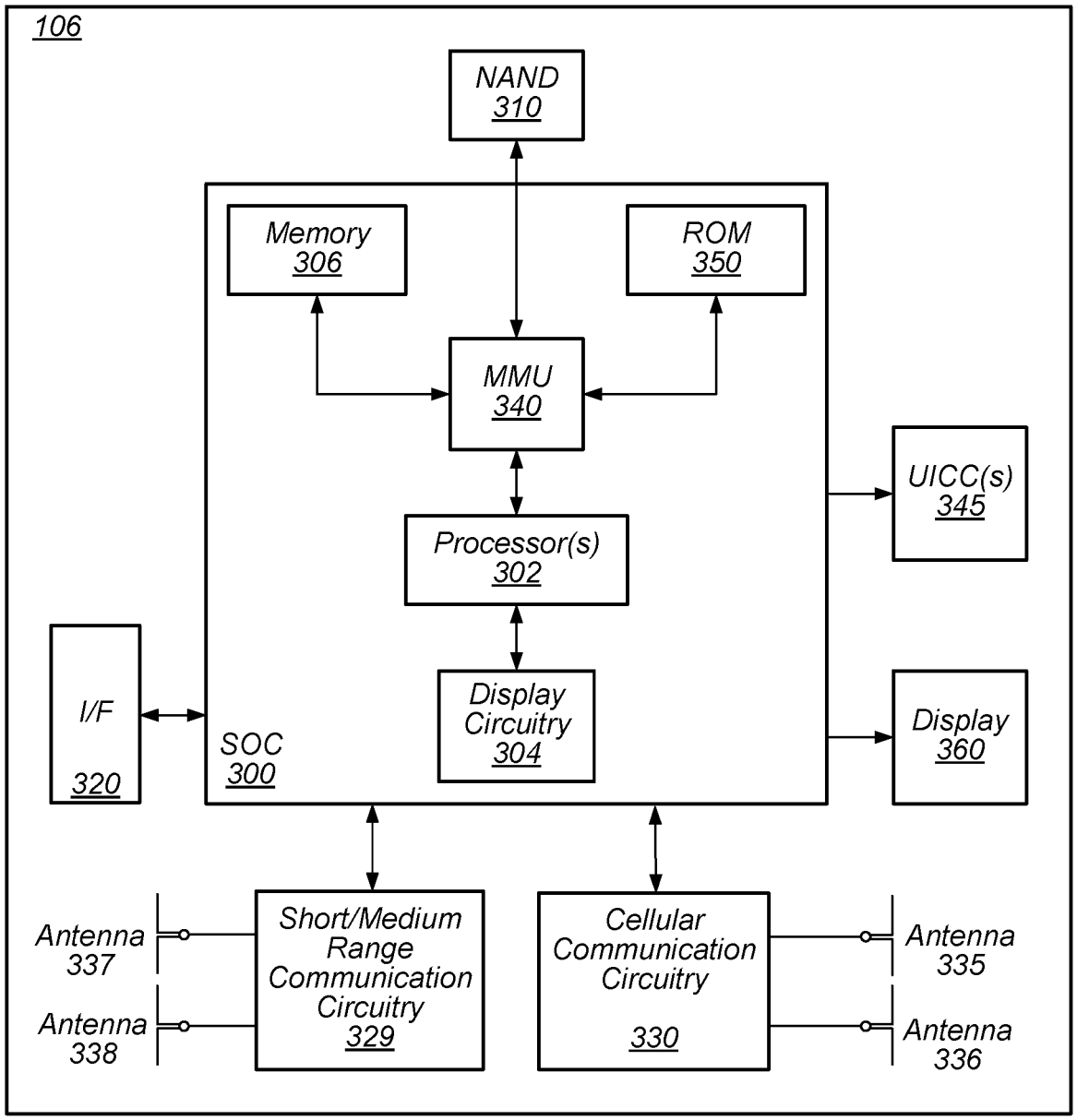
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
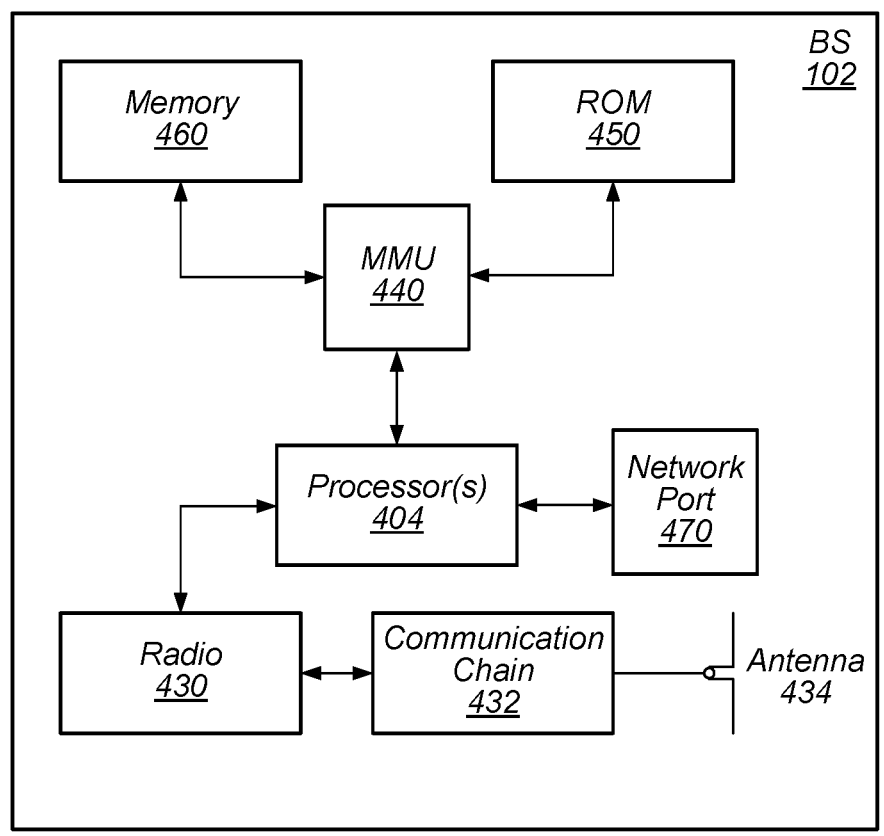
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
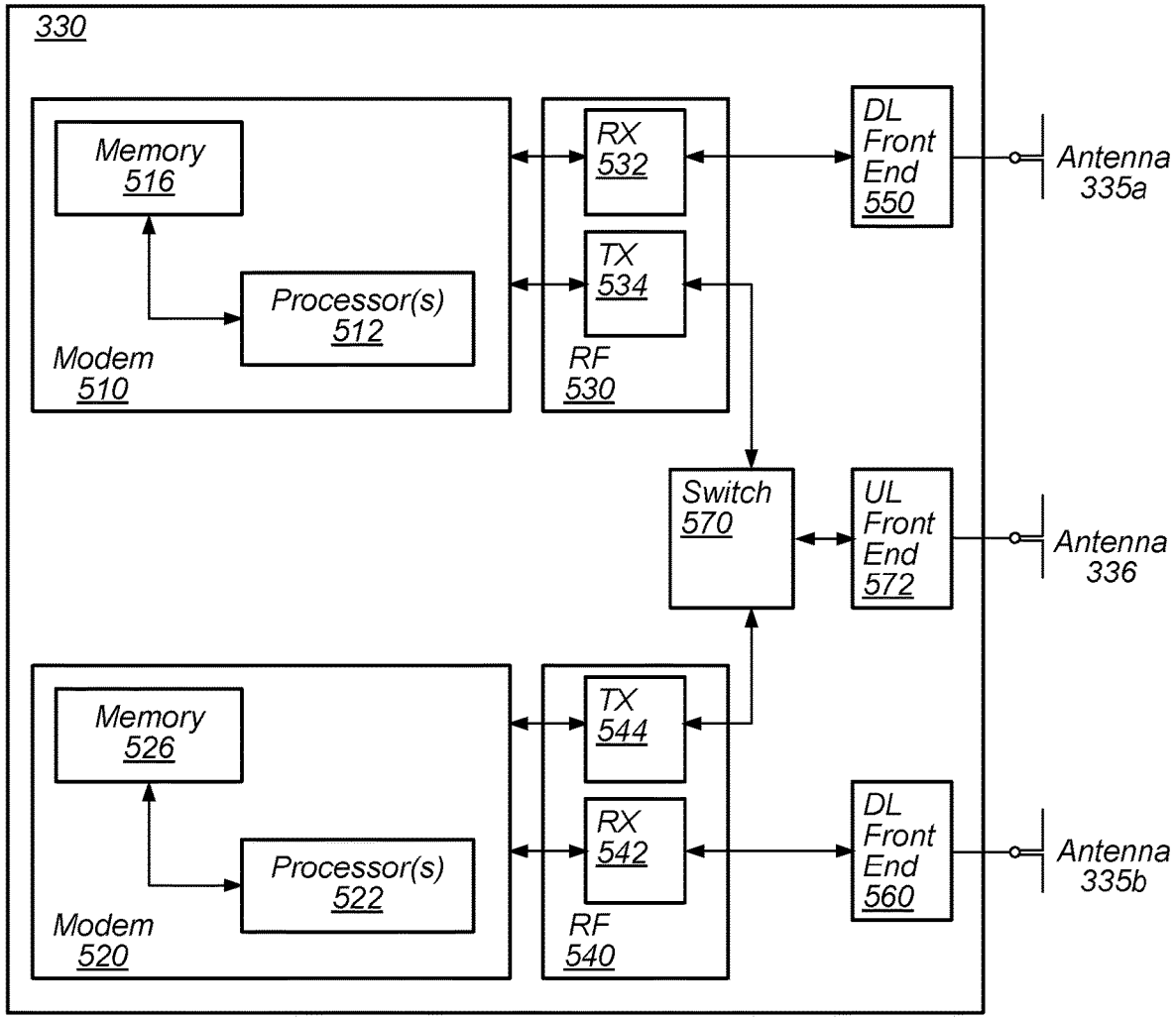
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
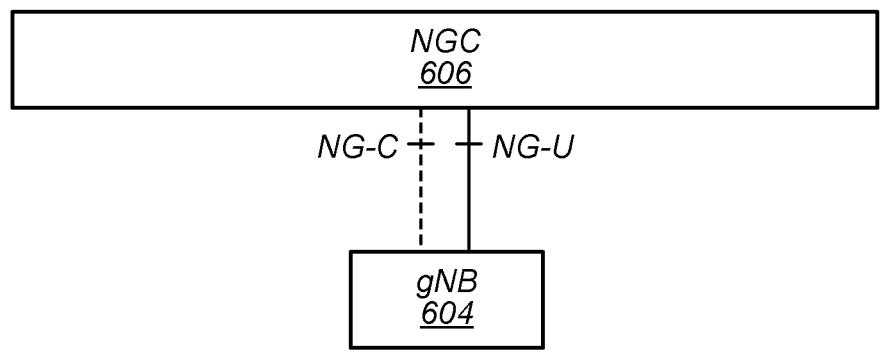
FIGS. 6 and 7 illustrate examples of a 5G NR base station (gNB), according to some embodiments.
Figure 7:
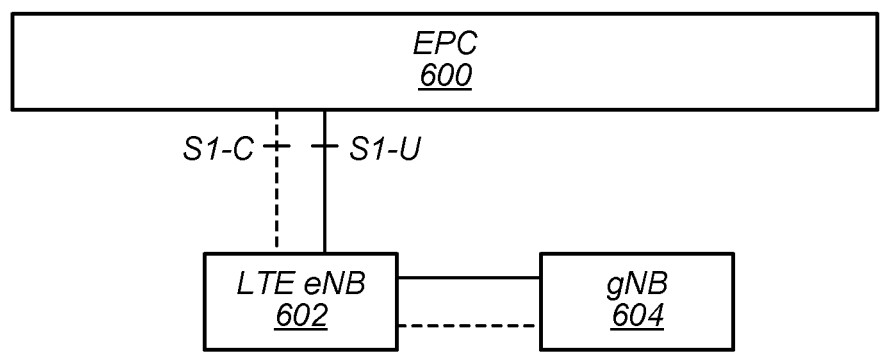

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
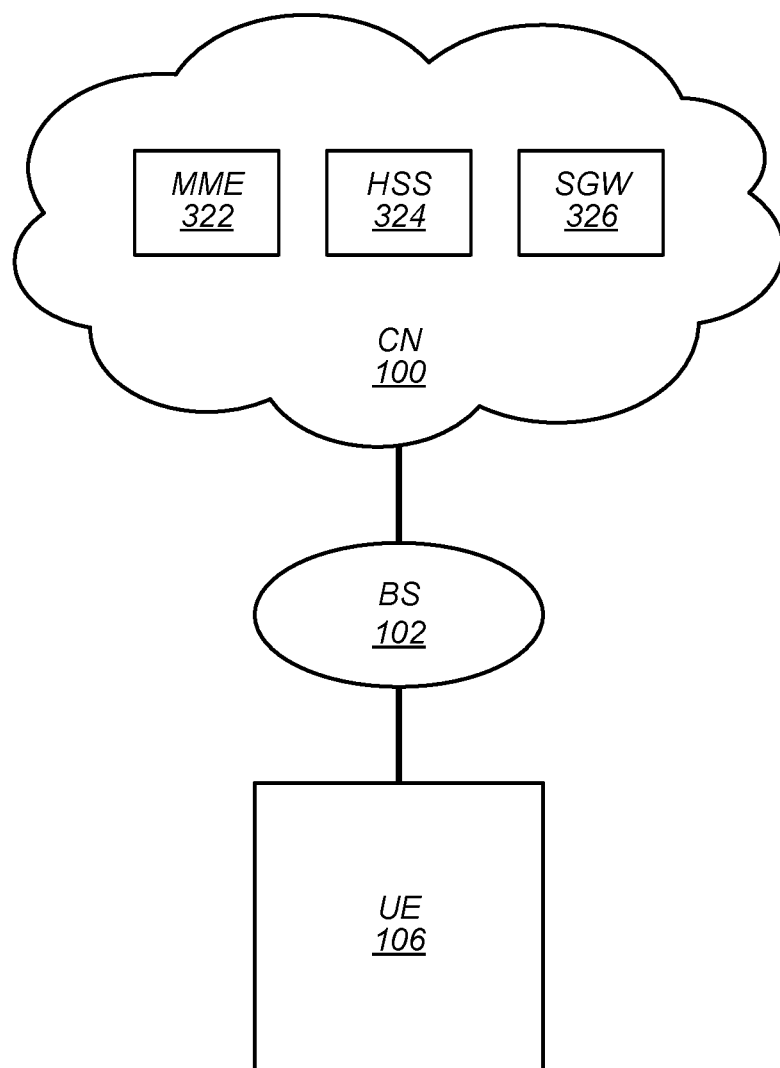
FIG. 8 illustrates an exemplary wireless network in communication with a UE, according to some embodiments.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

Selective Measurement of Neighbor Base Stations

As per wireless standards (e.g., NR RRC Specifications TS 38.331), a cellular network (e.g., a base station or other wireless network node) can configure idle and connected mode neighbor base station measurements (e.g., intra-frequency, inter-frequency, or inter-RAT). However, the network may not specify a priority or differentiated rate for performing the measurements for each neighbor base station.

Thus, in some embodiments, the UE may be configured to determine a priority for performing neighbor base station measurements, e.g., from the neighbor list provided by the network. This prioritization may be able to provide a better mobility experience and/or battery performance for the UE.

In some embodiments, by default, all neighbor measurement candidates configured by the network may be part of a "default" group, which may be measured at a default measurement rate and/or periodicity (e.g., specified in 3GPP TS 36.133).

The UE may be configured to move or otherwise categorize one or more of these candidate neighbor base stations in a "fast measurement group" (FMG) or a "slow measurement group" (SMG).

Neighbors included in the FMG may be measured at a relatively higher rate and periodicity (e.g., which may be configurable) when compared to the default measurement rate and periodicity, whereas neighbors included in the SMG may be measured at a relatively lower rate and periodicity (e.g., which may be configurable) when compared to the default measurement rate and periodicity.

According to some embodiments, whenever the network configures the UE to perform measurements (e.g., idle or connected mode measurements), the UE (e.g., the RRC layer of the UE) may use one or more of the following criteria to categorize base stations from the neighbor cell list and place them in the FMG (e.g., along with the serving cell) so that these neighbor base stations gets prioritized for an enhanced mobility procedure, or in the SMG.

In general, if the neighbor base station is configured or otherwise supports policies that allow the UE to quickly and efficiently perform measurements of the neighbor base station, that neighbor base station may be placed in the FMG. However, if the neighbor base station is not configured in such a manner, or does not support policies that allow the UE to quickly and efficiently perform measurements of the neighbor base station, that neighbor base station may be placed in the SMG. When a default group is used, neighbor base stations that are neither easy to measure nor problematic may remain in the default group. The following criteria are non-exhaustive and non-limiting examples for categorizing neighbor base stations.

In some embodiments, before starting measurements on a particular neighbor, the UE may try to read the SIB1 of the neighbor and then determine the PLMN (public land mobile network) of the neighbor cell. If the PLMN of the neighbor cell is not the HPLMN (home PLMN) or the EHPLMN (equivalent HPLMN) then the UE may place the particular neighbor in the SMG. If the PLMN is HPLMN or EHPLMN, the UE may place the particular neighbor in the FMG and/or leave it in the default group (e.g., as desired and/or depending on whether a default group is used).

In some embodiments, if a particular neighbor supports a dual connectivity (e.g., ENDC or MRDC) configuration (e.g., which may be indicated in the broadcast message of the neighbor), the UE may place this neighbor candidate in the FMG. In one embodiment, the UE may determine if the neighbor base station supports dual connectivity in one or more broadcast messages from the neighbor base station.

In some embodiments, if the network (e.g., the serving base station, such as in measurement configuration messages to the UE) indicates a neighbor cell is configured with deriveSSB-IndexFromCell, then that neighbor may be added as part of the FMG. The deriveSSB-IndexFromCell may indicate whether the UE can utilize serving cell timing to derive the index of SS block transmitted by the neighbor cell. For example, if this field is set to "true", the UE may assume SFN and frame boundary alignment across cells on the serving frequency as specified in TS 38.133.

In some embodiments, if the network (e.g., the serving base station, such as in measurement configuration messages to the UE) indicates that the UE is to perform gapless measurements on a particular neighbor, then the UE may add that neighbor candidate to the FMG.

In some embodiments, when the network (e.g., the serving base station, such as in measurement configuration messages to the UE) indicates the UE with a particular MeasurementGapScheme for a neighbor, the UE may add the neighbor to the FMG based on the MeasurementGapScheme and other parameters configured for measurements. These parameters indicate that the particular neighbor has more opportunity to be measured often (e.g., more often than other neighbors or typical neighbors).

In some embodiments, if the network (e.g., the serving base station, such as in measurement configuration messages to the UE) indicates that a particular neighbor frequency is configured with PCI ranges (e.g., indicated by the NW based on deployment, coverage, UEAssistanceInfo, etc.) then that neighbor and/or neighbor frequency may be added as part of the FMG.

In some embodiments, if the network (e.g., the serving base station, such as in measurement configuration messages to the UE) indicates a particular neighbor cell is configured with intraFreqReselection set to False, then that neighbor may be added as part of the SMG.

In some embodiments, if the network (e.g., the serving base station, such as in measurement configuration messages to the UE) indicates a particular neighbor cell is configured with eCallOverIMSSupport, then that neighbor frequency may be added to the FMG, e.g., when the UE is in limited service mode or an emergency call is going to start.

In some embodiments, if the network (e.g., the serving base station, such as in measurement configuration messages to the UE) indicates a particular neighbor cell has pre-RRC configuration, this neighbor frequency may be added as part of the FMG. For example, if the serving base station supports faster handover, it may provide a pre-configuration of the target neighbor base station to the UE. This pre-configuration may allow the UE to perform a faster handover procedure instead of waiting for the network to provide this information once the handover criteria has been satisfied (e.g., upon the UE transmitting a measurement report).

In some embodiments, if the UE ends up adding conNEstFailOffsetValidity value to a particular serving or neighbor cell and/or if no suitable or acceptable cell is found for this particular cell, then the UE may add it to the SMG. More generally, problematic cells, e.g., based on a history of problems by the UE or any data indicating the cell is problematic, the UE may add the neighbor to the SMG.

In some embodiments, if a particular neighbor satisfies any one of the criteria for FMG, it may be placed in FMG irrespective of other criteria.

In some embodiments, after categorizing the neighbor list, the UE may have many entries in the FMG. In some embodiments, if the FMG list has more than a threshold number of entries, then the UE may rank the entries in the order of the number of matching criteria and/or based on a prioritized listing of the criteria (e.g., where some criteria are more important than others), and select the threshold (configurable) number of neighbors. In some embodiments, the FMG and/or SMG may be measured in a prioritized order.

Note that while the present descriptions refer to the FMG and the SMG, there may be more than two divisions for the neighbor list. For example, there may also be a default group, for any neighbors that do not match criteria for either the FMG or the SMG. Thus, the FMG may be measured more often or with higher priority than the default group, which in turn may be measured more often or with higher priority than the SMG.

Further, note that while the descriptions herein are described from the UE point of view, any or all of these embodiments may also be implemented at the network side (e.g., by one or more base stations or other nodes of the network). For example, the network may be configured to segregate the neighbor list into one or more categories and/or prioritize one or more (or a plurality or all) of the neighbor list, e.g., and indicate that segregation or prioritization upon providing it to the UE, or at another time.

Figure 9:
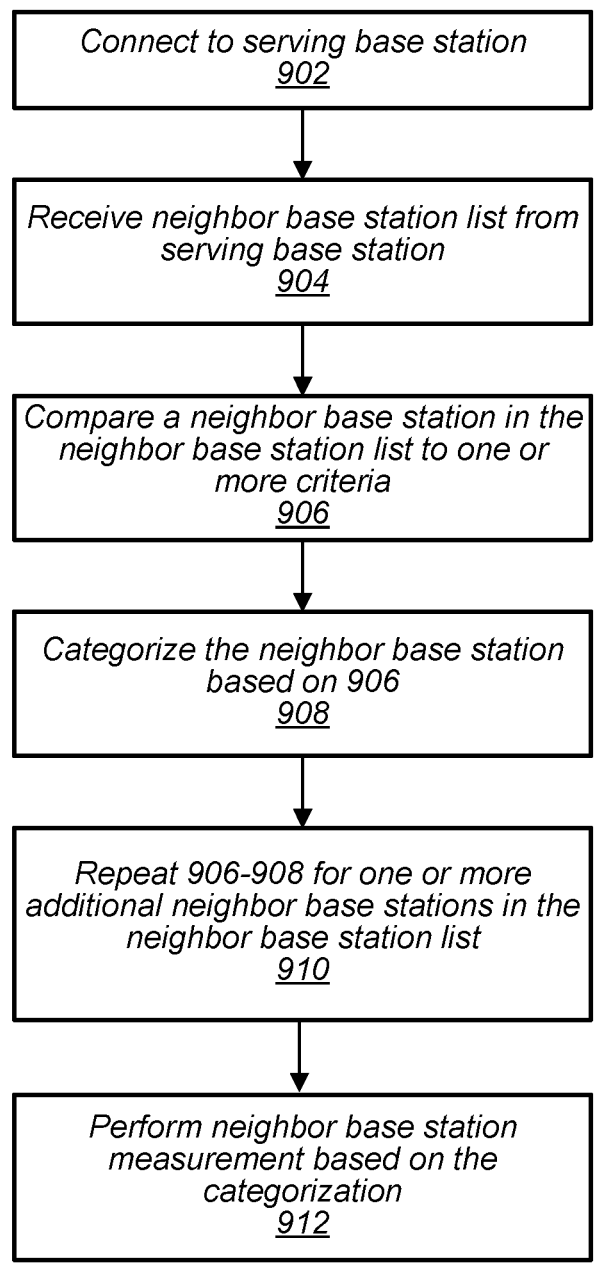
FIG. 9 is a flow chart diagram illustrating an example method for selective measurement of neighbor base stations, according to some embodiments.

FIG. 9—Selective Measurement of Neighbor Cells

FIG. 9 illustrates exemplary techniques for performing selective measurement of neighbor cells. Aspects of the method of FIG. 9 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

The UE (e.g., UE 106) may connect to a serving base station (902).

The UE may receive a neighbor base station list from the serving base station (904). The neighbor base station list may include a plurality of neighboring base stations (cells), of which the UE may be configured to perform periodic measurement (e.g., intrafrequency, interfrequency, and/or interRAT measurement).

The UE may compare a first neighbor base station in the neighbor base station list to one or more criteria, such as those described above, among others (906). The UE may categorize the first neighbor base station into one of a plurality of measuring groups based on the comparison to the criteria (908). For example, as discussed above, the UE may categorize the first neighbor base station as being part of the FMG or the SMG. In one embodiment, if the neighbor base station is not categorized in the FMG, it may be categorized in the SMG. Alternatively, the UE may categorize the first neighbor base station as being part of the FMG, the default group, or the SMG. In some embodiments, if the one or more criteria does not put the first neighbor base station in the FMG or the SMG, it may be left in the default group.

The categorization may be based on information obtained from the serving base station (e.g., information provided by the serving base station about the first neighbor base station). Alternatively, or additionally, the categorization may be based on information obtained from the first neighbor base station (e.g., information broadcast by the first neighbor base station). As another possibility, the categorization may be based on information stored by the UE about the neighbor base station. The categorization may also be based on the configuration of the UE or the present conditions of the UE (e.g., battery conditions, connectivity or signal strength conditions, etc.).

The UE may repeat 906 and 908 for one or more additional neighbor base stations in the neighbor base station list. In one embodiment, the UE may repeat 906-908 for each of the neighbor base stations in the neighbor base station list, although it is possible that it may only perform this categorization for less than all of the neighbor base stations in the neighbor base station list (e.g., a strict subset), if desired.

As noted above, after categorizing a plurality (or all) of the neighbor base stations, the UE may be configured to prune or modify the categorizations, e.g., based on thresholds. For example, only a threshold number of neighbor base stations may be allowed in the FMG or SMG, and the UE may be configured to prioritize and select for that threshold number in the respective group, as desired.

The UE may perform neighbor base station measurement based on the categorization. For example, the UE may perform measurements for neighbor base stations in the FMG at a higher rate and/or periodicity than measurements for neighbor base stations in the SMG. If a default group is used, measurements for neighbor base stations in the default group may be less often than the FMG, but more often than the SMG.

EXEMPLARY EMBODIMENTS

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

The following paragraphs provide example embodiments.

In some embodiments, a method for operating a UE may include: connecting to a serving base station; receiving a neighbor base station list from the serving base station; categorizing a first neighbor base station of the neighbor base station list into one of a plurality of measurement categories, wherein the UE is configured to perform measurements of neighbor base stations in respective categories at different rates; categorizing one or more additional neighbor base stations of the neighbor base station list into one of the plurality of measurement categories, wherein the first neighbor base station and the one or more additional neighbor base stations compose a plurality of neighbor base stations; and performing measurement of the plurality of neighbor base stations according to the categorization.

In some embodiments, the plurality of measurement categories include a fast measurement group (FMG) and a slow measurement group (SMG).

In some embodiments, the plurality of measurement categories include a fast measurement group (FMG), a default measurement group (DMG), and a slow measurement group (SMG).

In some embodiments, categorizing the first neighbor base station is based on information regarding the first neighbor base station received from the serving base station.

In some embodiments, categorizing the first neighbor base station is based on information received from the first neighbor base station.

In some embodiments, said categorizing the first neighbor base station includes determining if the first neighbor base station is part of the HPLMN or the EHPLMN.

In some embodiments, determining if the first neighbor base station is part of the HPLMN or the EHPLMN is based on SIB 1 information broadcast by the first neighbor base station.

In some embodiments, categorizing the first neighbor base station includes determining if the first neighbor base station supports dual connectivity.

In some embodiments, categorizing the first neighbor base station includes determining if the first neighbor base station is configured with deriveSSB-IndexFrom Cell.

In some embodiments, categorizing the first neighbor base station includes determining if the first neighbor base station supports gapless measurement.

In some embodiments, categorizing the first neighbor base station is based on a MeasurementGapScheme of the first neighbor base station.

In some embodiments, categorizing the first neighbor base station is based on indicated PCI ranges associated with the first neighbor base station.

In some embodiments, categorizing the first neighbor base station includes determining if the first neighbor base station supports intrafrequency reselection.

In some embodiments, categorizing the first neighbor base station is based on previous connection attempts with the first neighbor base station.

In some embodiments, the method may further include: comparing a number of neighbor base stations in a first measurement group against a threshold; and when the number of neighbor base stations in the first measurement group exceeds the threshold, removing one or more neighbor base stations from the first measurement group.

In some embodiments, removing the one or more neighbor base stations from the first measurement group includes: prioritizing the neighbor base stations in the first measurement group; and removing the one or more neighbor base stations based on said prioritizing.

In some embodiments, a device includes: an antenna; a radio coupled to the antenna; and a processing element coupled to the radio. The device may be configured to implement any of the method embodiments described above.

In some embodiments, a memory medium may store program instructions that, when executed, cause a device to implement any of the method embodiments described above.

In some embodiments, an apparatus includes: at least one processor (e.g., in communication with a memory), that is configured to implement any of the method embodiments described above.

In some embodiments, a method includes any action or combination of actions as substantially described herein in the Detailed Description and claims.

In some embodiments, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device is configured to perform any action or combination of actions as substantially described herein in the Detailed Description, Figures, and/or claims.

In some embodiments, a wireless device includes any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit is configured to perform any action or combination of actions as substantially described herein in the Detailed Description and/or Figures.

In some embodiments, a mobile station is configured to perform any action or combination of actions as substantially described herein in the Detailed Description and/or Figures.

In some embodiments, a mobile station includes any component or combination of components as described herein in the Detailed Description and/or Figures as included in a mobile station.

In some embodiments, a mobile device is configured to perform any action or combination of actions as substantially described herein in the Detailed Description and/or Figures.

In some embodiments, a mobile device includes any component or combination of components as described herein in the Detailed Description and/or Figures as included in a mobile device.

In some embodiments, a network node is configured to perform any action or combination of actions as substantially described herein in the Detailed Description and/or Figures.

In some embodiments, a network node includes any component or combination of components as described herein in the Detailed Description and/or Figures as included in a mobile device.

In some embodiments, a base station is configured to perform any action or combination of actions as substantially described herein in the Detailed Description and/or Figures.

In some embodiments, a base station includes any component or combination of components as described herein in the Detailed Description and/or Figures as included in a mobile device.

In some embodiments, a 5G NR network node or base station is configured to perform any action or combination of actions as substantially described herein in the Detailed Description and/or Figures.

In some embodiments, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   one or more processors, wherein the one or more processors are configured to cause a user equipment (UE) to:
      connect to a serving base station;
      receive a neighbor base station list from the serving base station;
      receive respective information from a plurality of neighbor base stations, including a first neighbor base station and one or more additional neighbor base stations;
      categorize the first neighbor base station of the neighbor base station list into one of a plurality of measurement categories based on the information received from the first neighbor base station, wherein the UE is configured to perform measurements of neighbor base stations in respective categories at different rates;
      categorize one or more additional neighbor base stations of the neighbor base station list into a different one of the plurality of measurement categories based on the information received from the one or more additional neighbor base stations; and
      performing measurement of the plurality of neighbor base stations according to the categorization.

2. The apparatus of claim 1, wherein the plurality of measurement categories include a fast measurement group (FMG) and a slow measurement group (SMG).

3. The apparatus of claim 1, wherein the plurality of measurement categories include a fast measurement group (FMG), a default measurement group (DMG), and a slow measurement group (SMG).

4. The apparatus of claim 1, wherein said categorizing the first neighbor base station is based on information regarding the first neighbor base station received from the serving base station.

5. The apparatus of claim 1, wherein said categorizing the first neighbor base station includes determining if the first neighbor base station is part of the home public land mobile network (HPLMN) or the equivalent HPLMN (EHPLMN).

6. The apparatus of claim 1, wherein said categorizing the first neighbor base station includes determining if the first neighbor base station is configured with deriveSSB-Index-From Cell.

7. The apparatus of claim 1, wherein said categorizing the first neighbor base station is based on a MeasurementGap-Scheme of the first neighbor base station.

8. The apparatus of claim 1, wherein said categorizing the first neighbor base station is based on indicated PCI ranges associated with the first neighbor base station.

9. The apparatus of claim 1, wherein said categorizing the first neighbor base station is based on previous connection attempts with the first neighbor base station.

10. A method for operating a user equipment device (UE), comprising:
   by the UE:
      connecting to a serving base station;
      receiving a neighbor base station list from the serving base station;
      receiving respective information from a plurality of neighbor base stations, including a first neighbor base station and a second neighbor base station;
      categorizing the first neighbor base station of the neighbor base station list into one of a plurality of measurement categories based on the information received from the first neighbor base station, wherein the UE is configured to perform measurements of the first neighbor base station at a first rate based on the first neighbor base station being categorized in the first measurement category;
      categorizing the second neighbor base station of the neighbor base station list into a second measurement category of the plurality of measurement categories based on the information received from the second neighbor base station, wherein the UE is configured to perform measurements of the second neighbor base station at a second rate based on the second neighbor base station being categorized in the second measurement category; and
      performing measurement of the first and second neighbor base stations at the respective first and second rates according to the categorization.

11. The method of claim 10, wherein the first measurement category includes a fast measurement group (FMG) and wherein the second measurement category includes a slow measurement group (SMG).

12. The method of claim 10, wherein said categorizing the first neighbor base station includes determining if the first neighbor base station is part of the home public land mobile network (HPLMN) or the equivalent HPLMN (EHPLMN).

13. The method of claim 12, wherein determining if the first neighbor base station is part of the HPLMN or the EHPLMN is based on SIB1 information broadcast by the first neighbor base station.

14. The method of claim 10, wherein said categorizing the first neighbor base station includes determining if the first neighbor base station supports dual connectivity.

15. The method of claim 10, wherein said categorizing the first neighbor base station is based on information regarding the first neighbor base station received from the serving base station.

16. A wireless device, comprising:
an antenna;
a radio coupled to the antenna; and
one or more processors coupled to the radio, wherein the one or more processors are configured to cause the wireless device to:
   receive a neighbor base station list from a wireless network;
   receive information from a plurality of neighbor base stations;
   categorize the plurality of neighbor base stations of the neighbor base station list into a plurality of measurement categories based on the information received from the plurality of neighbor base stations, wherein the wireless device is configured to perform measurements of neighbor base stations in respective categories at different rates; and
   perform measurement of the plurality of neighbor base stations according to the categorization.

17. The wireless device of claim 16, wherein said categorizing the plurality of neighbor base stations includes determining if a neighbor base station of the plurality of neighbor base stations supports gapless measurement.

18. The wireless device of claim 16, wherein said categorizing the plurality of neighbor base stations includes determining if a first neighbor base station supports intrafrequency reselection.

19. The wireless device of claim 16, wherein the one or more processors are further configured to:
   compare a number of neighbor base stations in a first measurement group against a threshold;
   when the number of neighbor base stations in the first measurement group exceeds the threshold, removing one or more neighbor base stations from the first measurement group.

20. The wireless device of claim 19, wherein said removing the one or more neighbor base stations from the first measurement group includes:
   prioritizing the neighbor base stations in the first measurement group; and
   removing the one or more neighbor base stations based on said prioritizing.

* * * * *